Aug. 18, 1953     A. LINTON ET AL     2,649,492
VOLTAIC CELL
Filed Aug. 29, 1951     2 Sheets-Sheet 1
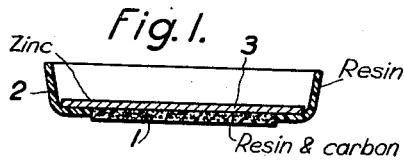
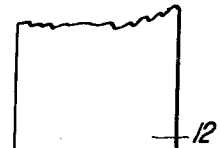
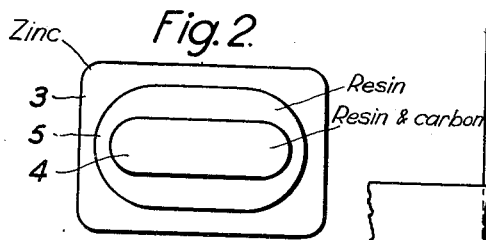
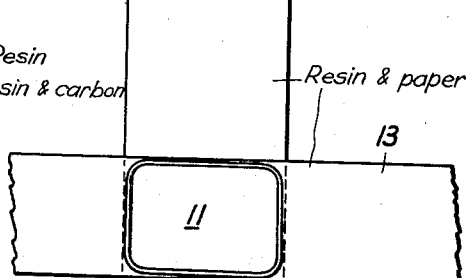
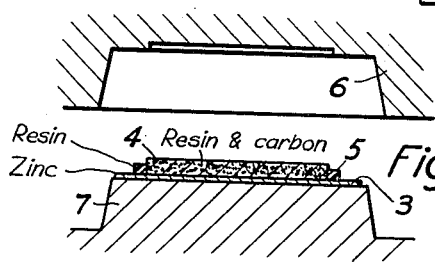
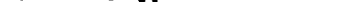
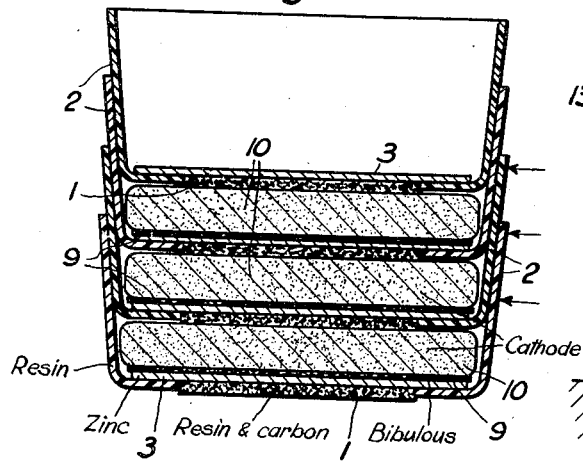
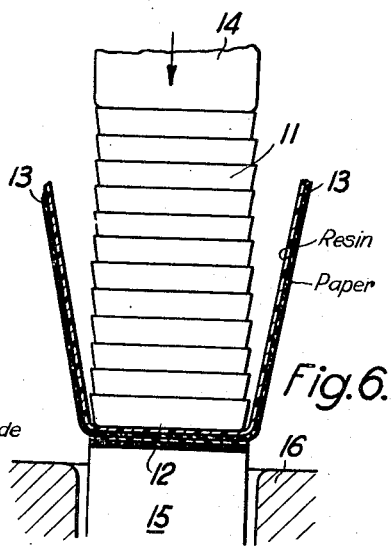
INVENTORS
Alfred Linton &
Richard Walter Lewis
BY
ATTORNEY

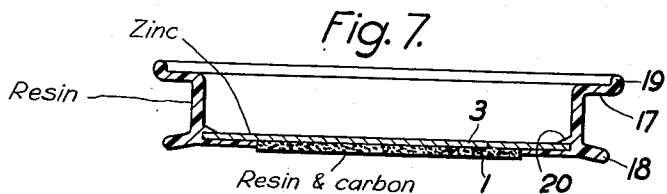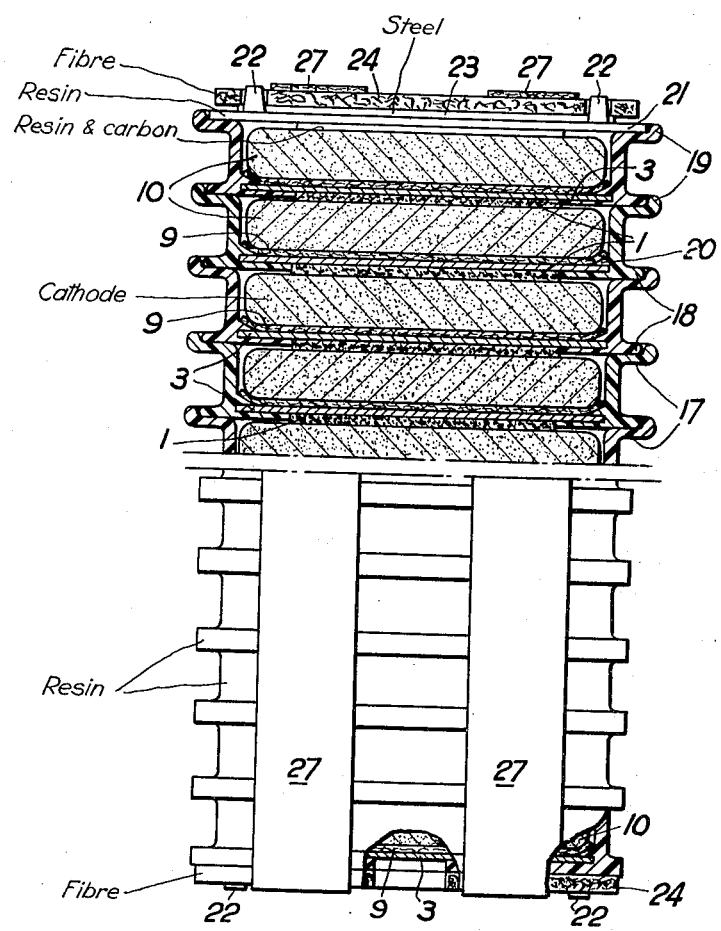

Patented Aug. 18, 1953

2,649,492

UNITED STATES PATENT OFFICE 2,649,492

VOLTAIC CELL

Alfred Linton and Richard W. Lewis, Dundee, Scotland, assignors to Burndept Limited, London, England, a British company Application August 29, 1951, Serial No. 244,132
In Great Britain December 11, 1950

6 Claims. (Cl. 136—111)

This invention relates to dry batteries of the layer type. Each cell of a layer type battery is made up of a flat negative electrode of metal, most commonly zinc or magnesium, a cathode of metal oxide or halide, as manganese dioxide or mercuric oxide, and an electrolyte with which the anode reacts held in an absorbent which also serves mechanically to separate the anode from the cathode. Because the cathode is a poor conductor current must be collected from it by means of a conductor in part concentrated to connect with the next cell or an external circuit and in part dispersed through the cathode. Enclosure of each cell is necessary to prevent loss of electrolyte and the making of short circuits or local circuits in the battery.

This invention is particularly concerned with the building of the connector by which the cathode, rendered conductive by the conductive particles dispersed throughout it, is joined to the anode of the next cell, and with the sealing of the cell.

Hitherto the enclosure necessary to prevent the electrolyte escaping or drying up has sometimes been provided by wrapping the edges of the cathode and electrolyte-containing absorbent, or of all the components of the cell, in impervious insulating sheet material; it is difficult to seal the sheet material to the layers of the cell or to the enclosure of the next cell; electrolyte finds its way to the junction with the next cell and between the enclosures of neighbouring cells. Another plan is to build the cell in a container of insulating material shaped to nest in the neighbouring container, and to seal the containers together with adhesive; there is necessarily a hole in the bottom of the container through which connection is made with the next cell and it is difficult to make a seal around this or between the containers. Yet another plan is to make the anode itself a nesting cell container, but it is necessary to insulate the nested anodes one from another as well as to seal each cell. So while each of these methods is capable of producing a good proportion of satisfactory batteries, they fall short of perfection when carried out, as they must be, by relatively unskilled operatives in the mass production of batteries.

This invention is an improved method of making a connector in good conductive connection with an anode and sealed to the cell receptacle, and of building up a battery from cells assembled in the receptacles and sealing the cells.

According to the invention a connector united with a cell receptacle is made by moulding under heat and pressure a dry mixture of a conductor, usually carbon, and a thermoplastic resin, both in the form of fine powders, in proportions and under conditions which result in a conductive, flexible connector, resistant to the electrolyte and unaffected by the temperatures to which the battery may be exposed. In order that the carbon particles may come into contact in the course of molding it is necessary that the resin should not merely soften but become fairly mobile; its viscosity at the moulding temperature should not exceed about 6 poises. When solid the resin should be flexible so that the cell may yield to the mechanical stresses set up in it during discharge. It must also be chemically inert with respect to the active components of the cell, more especially the cathode and electrolyte, and should be stable up to a temperature, say 70°, well above any to which the battery will be exposed during storage and use. A suitable resin for the purpose is polythene; an appropriate degree of polymerisation giving the desired low viscosity is that of the product sold by Imperial Chemical Industries as grade 200 under the registered trade mark Alkathene. Of the forms of finely divided carbon available, graphite is preferred on account of its high conductivity, hardness, and density, and because it is impervious and not easily wetted. It should be ground to pass a 300 British Standard Specification screen.

For moulding, the mixture is heated and then pressed between dies kept cool enough to prevent sticking.

A carbon current collector so made may subsequently be placed upon or stuck to a sheet of zinc or other anode metal, but it is also possible, by working at a high temperature, to mould the collector to the electrode in one operation. For this purpose the surface of the anode metal intended for the negative electrode is first sandblasted, and there is then placed on it a pellet of the mixture of carbon and resin; it is heated to a temperature slightly above the melting point of the resin so that the pellet adheres to the metal and the two are then transfererd to a press while still hot.

It has hitherto been usual to provide a current-collecting layer of carbon upon a zinc electrode—to make a duplex electrode as it is sometimes called—by repeatedly painting the metal with a suspension of carbon in a solution of a resin, an oil, or both in a volatile solvent. Whereas four or five coatings are necessary to build up a film of 0.01" by this method, and the film so built is irregular in thickness and may have pinholes in it, the method of this invention makes it possible to form in one operation a carbon layer of double that thickness, and of higher specific conductivity.

The current collector and cell receptacle may be moulded in the form of a shallow cup shaped to nest in its neighbour. A better plan is to mould such a cup in part of a mixture of resin and carbon and in part of resin alone. For this purpose there is placed on a sheet of anode metal, hereinafter referred to as zinc, a pellet of the carbon and resin mixture of adequate area and thickness, say of about one third the area of the zinc, and this is surrounded by a washer consisting of resin only. In the press the two are united with each other and the zinc and moulded to cup form, the middle part of the bottom of the cup being conductive and its walls insulating.

To combined cell containers, current collectors and anodes so made the remaining components of cells may be added, namely bibulous sheets to hold electrolyte, a cathode tablet and finally a measured quantity of electrolyte, and by nesting a pile of such cells one in the other each carbon collector is brought into contact with the cathode tablet in the container beneath it.

The cell containers have still to be sealed together. The most satisfactory way of sealing two layers of polythene together is to heat them under pressure. It is difficult to exert satisfactory pressure normal to the walls of the cups of which a battery is built, since the cell contents form the abutment against which the walls are pressed. The edge of the zinc sheet is too thin to be a satisfactory abutment, and if the cathode tablet, which in any case is also not a wholly satisfactory abutment, has been made smaller than the cell container to allow of swelling the cell will be deformed in sealing. For greater certainty of sealing the cell containers may be made deep enough for the walls of one to extend over the walls of at least two others when the containers are nested, when by sealing at the level of each cell two seals will be formed between the walls of any two neighbouring containers; but this much reduces the flexibility of the cell walls. Alternatively, by the use of tapes of widths equal to the width and length of a cell respectively and composed of a polythene or like layer on a paper base, the cells of the battery may be sealed by the tapes which bind them under pressure. A yet better method, permitting of more complete exhaustion of the cell without rupture, is to flange the containers, instead of making them to nest, and to seal the flanges together.

The invention is illustrated in the accompanying drawings in which

Fig. 1 shows a combined current-collector, cell container and anode;

Fig. 2 shows in plan the material from which it is moulded;

Fig. 3 shows the material in edge view between the dies by which it is to be consolidated and shaped;

Fig. 4 shows a few cells built in such composite cell containers assembled in nested relation to form a battery;

Figs. 5 and 6 illustrate an alternative method of sealing such a battery;

Fig. 7 shows in section a preferred form of current collector, cell container and anode, and Fig. 8 shows partly in section and partly in elevation a battery built up from components of this form.

It should be noted that the drawings are of necessity diagrammatic, it being necessary to exaggerate the thickness of the layers of which an electrode, cell or battery is composed and this involves distortion of their form in other respects.

Fig. 1 shows a current collector, cell container and anode moulded together. The current collector is a conductive layer 1 of carbon agglomerated with polythene, or material of like properties, occupying the middle part of the bottom of the container. The peripheral part of the bottom and the walls 2 of the container are of polythene or like material alone, and therefore insulating. Within the container, there is moulded to the current collector the anode 3, consisting of a flat sheet of zinc.

The manner in which this component is made will be understood from Figures 2 and 3. On the sheet of zinc 3 there is placed a lozenge or tablet 4 consisting of a mixture of carbon and polythene or like material both in finely divided form. The proportion of carbon to polythene by weight should preferably not be less than 7 to 3, otherwise the resistance of the collector will be unnecessarily high. The proportion may be as much as 9 to 1; if too large a proportion of carbon is used the collector will be pervious to water. Around the tablet 4 is placed a washer 5 of polythene or like material containing enough resin to fill the mould. The metal sheet with the mouldable components upon it is heated to a little above the melting point of the resin, which then becomes adherent to the zinc, and is then placed while hot between dies 6, 7 which are kept cool enough not to stick to the resin.

By merely interchanging the dies 6, 7 the zinc plate 3 could be moulded to the outside of the cell container. If the moulding were made wholly of the carbon and polythene mixture the container walls would be conductive and insulation would have to be provided between one container and the next.

In each component made as shown by Figs. 1 to 3 are placed one or more layers of bibulous paper 9 or equivalent means of retaining electrolyte, a cathode or depolariser 10 made conductive by carbon powder dispersed through it, and finally a measured quantity of electrolyte which soaks into the cathode 10 and bibulous sheets 9. Cells so completed are assembled in nested relation in the manner shown in Fig. 4, and neighbouring containers are then sealed together by applying heat and inward pressure to the walls of the cups. For the reasons already explained the containers shown in Fig. 5 are made much deeper than is shown in Fig. 2, so that by sealing at the positions indicated roughly by the arrows in Fig. 4 two seals can be formed between each pair of nesting cups.

In lieu of employing such deep cups the method of sealing shown in Figs. 5 and 6 may be adopted. A pile 11 of such cells as shown in Fig. 1 is placed upon crossed bands or tapes 12, 13 made of polythene-coated paper, and of a width equal to the width and length of a cell respectively. The coated side is next the pile. The pile is compressed between anvils 14, 15 and so compressed is passed with the crossed strips 12, 13 through a heated die 16 which presses the coated paper firmly against the cells and causes the resin coating to coalesce with the cell walls. The presence of the paper prevents the cell walls collapsing in molten condition. The ends of the coated strips may be superposed on the top of the battery and sealed together. The battery may then be fitted with terminals and placed in a cardboard container or other wrapping in known manner.

Unless very carefully done the heating and pressing of the cell walls involved in the methods of sealing shown in Figs. 4, 5 and 6 is liable to cause electrolyte to spirt up to the mouth of the cell, preventing thorough sealing and leading to short life in storage especially under tropical conditions. Also, since the pressure is likely to be taken chiefly by the edge of the zinc sheet, unless the cup is moulded with a greatly thickened rounding of bottom into wall the zinc may penetrate the resin. For these reasons the construction of cell and method of sealing illustrated by Figs. 8 and 9 are preferred.

For this method the cup is moulded with an outwardly turned lip or flange 17, and with a similar flange 18 at its bottom. The lip 17 is formed with an upturned rim 19, which serves to position the next cup when the cells are assembled. The flanges should diverge at an angle of about 10°, either through the lip 17 being inclined upward or through the flange 18 being inclined downward as shown, so that when the cups are assembled the lower flange of one will press on the lip of its neighbour notwithstanding slight variations in the depth of the contents, and the two will come into good surface contact. By bevelling the die the cup is made with a tongue 20 covering the margin of the zinc 3 and perfecting the seal around it.

Bibulous sheets 9 and a cathode 10 are placed in each cell as already explained, and electrolyte added. A pile of cells is then assembled as seen in the upper part of Fig. 8. On the top one is placed a moulded flat sheet 21, the middle part of which consists of polythene or like material and carbon projecting slightly to make contact with the cathode of the cell at the positive end of the battery, while the marginal part is of polythene or like material alone. From this marginal part project integral locating studs 22. These position a pressure plate 23 of steel and also an insulating end plate 24 in which is a central opening to give access for soldering a connection to the pressure plate. The cell at the negative end of the battery consists of a moulded cup containing the anode as above described, but having no conductive centre. It is made with locating studs and with an opening in the middle registering with an opening in the insulating end plate 24. The assembled pile is compressed between dies, the end plates distributing the pressure, and while so held it is bound in well known manner with tapes of paper 27 or other binders.

The insulating end plates 24 are made somewhat greater in length and breadth than the walls of the cups, but less than the lips and flanges of the cups. The assembled pile is laid on one side, resting on its rims 19, upon a hot plate or heated conveyor band, which is maintained at a sufficient temperature to melt the polythene. The lip 17, 19 of each cell is thus united along one edge to the flange 18 of its neighbour. The depth to which the edges melt is determined by the insulating end plates 24, and the battery is not kept on the hot plate longer than is necessary for this to occur. By this means the heat is kept far enough from the electrolyte and the walls of the cups not to cause trouble. By turning the battery over the remaining edges are similarly sealed, making the whole battery resemble the lower part of Fig. 8. There being only a single wall, instead of two or three nested together, the cell is very flexible, and can yield as its contents swell in use, thereby preventing any great stress coming upon the seal.

We claim:

1. A connector and cell container for electric dry batteries of the layer type, comprising a cup to receive the electrodes and electrolyte, at least a part of the area of the bottom of said cup consisting of a conductive and impervious agglomeration of finely divided carbon in a matrix of polythene, and the remainder of the cup of polythene alone integrally united with the conductive agglomeration.

2. A layer type dry battery comprising a plurality of cell containers, each having at least a part of its bottom made of a conductive and impervious agglomeration of finely divided carbon in a matrix of resin and the remainder including its walls made of resin alone moulded integrally with the conductive part, each cup containing the electrodes and electrolyte-containing layer of a cell, the wall of each cup being welded in liquid-tight fashion to that of the cup next above it.

3. In the manufacture of electric dry batteries, the method of making a connector integrally united in liquid-tight manner with a cell receptacle which consists in intimately mixing finely divided carbon with a fine powder of thermoplastic resin in a sufficient proportion to yield a conductive product, consolidating such mixture into a lozenge, consolidating into a washer fitting around said lozenge a sufficient quantity of the resin powder alone, and moulding the lozenge and surrounding washer under heat and pressure into the form of a shallow cup having a bottom which is conductive at least in its mid area.

4. A cell container for electric dry cells of the layer type comprising a shallow cup of resin adapted to contain the electrodes and electrolyte of the cell and having part of its bottom rendered conductive by admixture of carbon with the resin, said cup having an outwardly turned lip and an outwardly extending flange at the bottom.

5. A method of building a layer type battery which consists in intimately mixing finely divided carbon with finely divided resin in sufficient proportion to form a conductive moulding, surrounding said mixture with finely divided resin, moulding the mixed and pure powders by heat and pressure into the form of a shallow cup with outwardly turned lip and outwardly extending bottom flange, putting in each of several such cups the electrodes and electrolyte of a cell, assembling the filled cups in a pile with end plates at the ends of the pile of dimensions greater than those of the cups and less than those of the lips and flanges and binding the pile together, and melting together the contacting lips and flanges by placing each side of the assembled pile in turn upon a hot plate.

6. An electric dry battery comprising a plurality of cells each contained in a cell container having an outwardly turned lip and outwardly extending flange, the lip of each cell being fused into liquid-tight union with the flange of the next cell.

ALFRED LINTON.
RICHARD W. LEWIS.

(References on following page)

References Cited in the file of this patent

UNITED STATES PATENTS

| Number | Name | Date |
|---|---|---|
| Re. 22,065 | Young | Apr. 7, 1942 |
| 2,144,574 | MacCallum | Jan. 17, 1939 |
| 2,375,875 | Sanderson | May 15, 1945 |
| 2,416,576 | Franz et al. | Feb. 25, 1947 |
| 2,487,985 | Ruben | Nov. 15, 1949 |
| 2,519,052 | Krachenfels | Aug. 15, 1950 |
| 2,519,054 | Woodring | Aug. 15, 1950 |

FOREIGN PATENTS

| Number | Country | Date |
|---|---|---|
| 554,926 | Great Britain | July 26, 1943 |
| 558,207 | Great Britain | Dec. 24, 1943 |